United States Patent
Chaudhary et al.

(10) Patent No.: US 10,354,195 B2
(45) Date of Patent: **\*Jul. 16, 2019**

(54) FORECASTING LEAKS IN PIPELINE NETWORK

(71) Applicant: Utopus Insights, Inc., Valhalla, NY (US)

(72) Inventors: Harsh Chaudhary, Briarcliff Manor, NY (US); Younghun Kim, White Plains, NY (US); Tarun Kumar, Mohegan Lake, NY (US); Abhishek Raman, Santa Clara, CA (US); Rui Zhang, Ossining, NY (US)

(73) Assignee: Utopus Insights, Inc., Valhalla, NY (US)

( \* ) Notice: Subject to any disclaimer, the term of this patent is extended or adjusted under 35 U.S.C. 154(b) by 50 days.

This patent is subject to a terminal disclaimer.

(21) Appl. No.: 15/387,900

(22) Filed: Dec. 22, 2016

(65) Prior Publication Data

US 2017/0178016 A1    Jun. 22, 2017

Related U.S. Application Data

(63) Continuation of application No. 14/976,903, filed on Dec. 21, 2015, now Pat. No. 9,558,453.

(51) Int. Cl.
*G06N 7/00* (2006.01)
*G06Q 10/04* (2012.01)
(Continued)

(52) U.S. Cl.
CPC .......... *G06N 7/005* (2013.01); *G01M 3/2815* (2013.01); *G06F 17/18* (2013.01); *G06Q 10/04* (2013.01)

(58) Field of Classification Search
CPC ...... G06N 7/005; G01M 3/2815; G06F 17/18; G06Q 10/04
See application file for complete search history.

(56) References Cited

U.S. PATENT DOCUMENTS 3,975,945 A * 8/1976 Hauk .................. G01M 3/2861
                                                              73/46
4,099,405 A * 7/1978 Hauk .................. G01M 3/2861
                                                              277/320

(Continued)

OTHER PUBLICATIONS

Harsh Chaudhary et al. "Detecting Small Leaks in Pipeline Network ", U.S. Appl. No. 14/976,960, filed Dec. 21, 2015, now U.S. Pat. No. 9,395,262, Jul. 19, 2016.

(Continued)

*Primary Examiner* — Lisa M Caputo
*Assistant Examiner* — Philip L Cotey
(74) *Attorney, Agent, or Firm* — Ahmann Kloke LLP

(57) ABSTRACT

Technical solutions are described for forecasting leaks in a pipeline network. An example method includes identifying a subsystem in the pipeline network that includes a first station. The method also includes accessing historical temporal sensor measurements of the stations. The method also includes generating a prediction model for the first station that predicts a pressure measurement at the first station based on the historical temporal sensor measurements at each station in the subsystem. The method also includes predicting a series of pressure measurements at the first station based on the historical temporal sensor measurements. The method also includes determining a series of deviations between the series of pressure measurements and historical pressure measurements of the first station and identifying a threshold value from the series of deviations, (Continued)

where a pressure measurement at the first station above or below the threshold value is indicative of a leak in the subsystem.

20 Claims, 14 Drawing Sheets

(51) Int. Cl.
*G01M 3/28* (2006.01)
*G06F 17/18* (2006.01)

(56) References Cited

U.S. PATENT DOCUMENTS

| | | | | |
|---|---|---|---|---|
| 4,651,559 | A * | 3/1987 | Horigome | G01M 3/2815 73/40.5 R |
| 5,546,789 | A * | 8/1996 | Balke | G01M 3/3281 73/40 |
| 6,567,006 | B1 * | 5/2003 | Lander | G01M 3/243 340/605 |
| 9,395,262 | B1 * | 7/2016 | Kumar | G01M 3/2807 |
| 9,558,453 | B1 * | 1/2017 | Chaudhary | G06N 7/005 |
| 2002/0120411 | A1 * | 8/2002 | Fierro | G01M 3/2815 702/51 |
| 2005/0246112 | A1 * | 11/2005 | Abhulimen | F17D 5/02 702/51 |
| 2012/0059684 | A1 * | 3/2012 | Hampapur | G06Q 10/06 705/7.28 |
| 2015/0308919 | A1 * | 10/2015 | Zhang | G01M 3/243 702/51 |
| 2016/0292652 | A1 * | 10/2016 | Bowden, Jr. | G06Q 10/20 |

OTHER PUBLICATIONS

Harsh Chaudhary et al. "Forecasting Leaks in Pipeline Network", U.S. Appl. No. 14/976,903, filed Dec. 21, 2015, now U.S. Pat. No. 9,558,453, Jan. 31, 2017.

Harsh Chaudhary et al. "Leak Identification in a Mass Transport Network", U.S. Appl. No. 15/009,340, filed Jan. 28, 2016.

Harsh Chaudhary et al. "Leak Localization in Pipeline Network", U.S. Appl. No. 15/009,321, filed Jan. 28, 2016, now U.S. Pat. No. 9,470,601, Oct. 18, 2016.

Harsh Chaudhary et al. "Linepack Delay Measurement in Fluid Delivery Pipeline", U.S. Appl. No. 14/976,870, filed Dec. 21, 2015, now U.S. Pat. No. 9,599,499, Mar. 21, 2017.

Harsh Chaudhary et al. "Network Graph Representation of Physically Connected Network", U.S. Appl. No. 15/009,291, filed Jan. 28, 2016, now U.S. Pat. No. 9,473,368, Oct. 18, 2016.

Harsh Chaudhary et al. "Temporal Delay Determination for Calibration of Distributed Sensors in a Mass Transport Network", U.S. Appl. No. 15/009,262, filed Jan. 28, 2016.

Harsh Chaudhary et al. "Topological Connectivity and Relative Distances From Temporal Sensor Measurements of Physical Delivery System", U.S. Appl. No. 14/976,820, filed Dec. 21, 2015, now U.S. Pat. No. 9,599,531, Mar. 21, 2017.

List of IBM Patents or Patent Applications Treated as Related; (Appendix P), Filed Jun. 15, 2017; 2 pages.

* cited by examiner

FORECASTING LEAKS IN PIPELINE NETWORK

PRIORITY

This application is a continuation of and claims priority from U.S. patent application Ser. No. 14/976,903, filed on Dec. 21, 2015, entitled "FORECASTING LEAKS IN PIPELINE NETWORK", the entire contents of which are incorporated herein by reference.

BACKGROUND

The present application relates to a physical delivery system, and more specifically, to determining topological connectivity and relative distances from temporal sensor measurements of the physical delivery system.

A physical delivery system includes a pipeline system that delivers fluids, such as liquid and/or gas. For example, a gas pipeline system to deliver gas, which is used as fuel for heating, cooling, or any other purpose, is a physical delivery system. In the U.S. alone, there are about 91,000 miles of gas pipelines, and 99% of the gas delivery in the U.S. is through the gas pipeline delivery system. In a physical delivery system, such as one that delivers natural gas, there may be delays between a supply node and a delivery node, for example because natural gas is compressible. For example, in case of natural gas, to meet an expected demand for gas, a compressor station may pump gas ahead of the actual demand occurrence. The physical delivery system includes a network of pipes, that may be represented as a tree structure, with a compressor operating at a root node and trunk lines to maintain the pressure and flowrate across multiple delivery points in the tree structure.

SUMMARY

According to an embodiment, a computer implemented method for forecasting leaks in a pipeline network includes identifying a subsystem in the pipeline network, the subsystem including a plurality of stations that are topologically connected, the plurality of stations including a first station. The computer implemented method also includes accessing historical temporal sensor measurements of the stations in the subsystem, the historical temporal sensor measurements including pressure measurements captured at corresponding timestamps over a predetermined time-span. The computer implemented method also includes generating a prediction model for the first station that predicts a pressure measurement at the first station based on the historical temporal sensor measurements at each station in the subsystem. The computer implemented method also includes predicting, according to the prediction model, a series of pressure measurements at the first station based on the historical temporal sensor measurements at each station in the subsystem, where the series of pressure measurements is for a series of timestamps in the historical temporal sensor measurements. The computer implemented method also includes determining a series of deviations between the series of pressure measurements and historical pressure measurements of the first station. The computer implemented method also includes identifying a threshold value from the series of deviations, where a pressure measurement at the first station above or below the threshold value is indicative of a leak in the subsystem.

According to another embodiment, a system for forecasting leaks in a pipeline network includes a memory and a processor. The processor identifies a subsystem in the pipeline network, the subsystem including a plurality of stations that are topologically connected, the plurality of stations including a first station. The processor also accesses historical temporal sensor measurements of the stations in the subsystem, the historical temporal sensor measurements including pressure measurements captured at corresponding timestamps over a predetermined time-span. The processor also generates a prediction model for the first station that predicts a pressure measurement at the first station based on the historical temporal sensor measurements at each station in the subsystem. The processor also predicts, according to the prediction model, a series of pressure measurements at the first station based on the historical temporal sensor measurements at each station in the subsystem, where the series of pressure measurements is for a series of timestamps in the historical temporal sensor measurements. The processor also determines a series of deviations between the series of pressure measurements and historical pressure measurements of the first station. The processor also identifies a threshold value from the series of deviations, where a pressure measurement at the first station above or below the threshold value is indicative of a leak in the subsystem.

According to another embodiment, a computer program product for forecasting leaks in a pipeline network includes a computer readable storage medium. The computer readable storage medium includes computer executable instructions to identify a subsystem in the pipeline network, the subsystem including a plurality of stations that are topologically connected, the plurality of stations including a first station. The computer readable storage medium includes computer executable instructions to access historical temporal sensor measurements of the stations in the subsystem, the historical temporal sensor measurements including pressure measurements captured at corresponding timestamps over a predetermined time-span. The computer readable storage medium includes computer executable instructions to generate a prediction model for the first station that predicts a pressure measurement at the first station based on the historical temporal sensor measurements at each station in the subsystem. The computer readable storage medium includes computer executable instructions to predict, according to the prediction model, a series of pressure measurements at the first station based on the historical temporal sensor measurements at each station in the subsystem, where the series of pressure measurements is for a series of timestamps in the historical temporal sensor measurements. The computer readable storage medium includes computer executable instructions to determine a series of deviations between the series of pressure measurements and historical pressure measurements of the first station. The computer readable storage medium includes computer executable instructions to select, from the series of deviations, a subset of deviations corresponding to timestamps at which a leak in the pipeline network was reported. The computer readable storage medium includes computer executable instructions to identify a threshold value from the selected deviations, where a pressure measurement at the first station above or below the threshold value is indicative of a leak in the subsystem.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
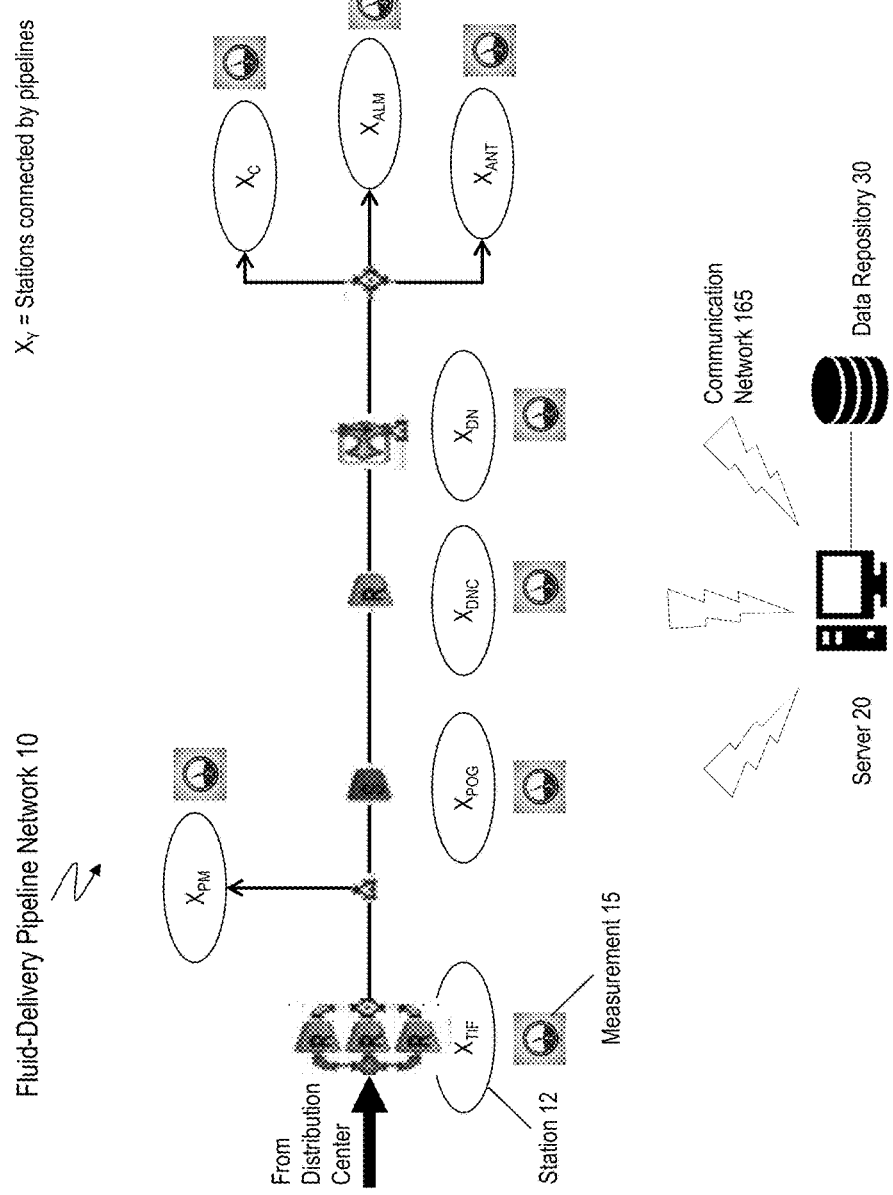
FIG. 1 illustrates an example fluid-delivery pipeline network, in accordance with an embodiment.

Establishing Topological Connectivity of a Pipeline Network

Disclosed here are technical solutions for utilizing temporal delay measurements of a fluid in a physical delivery system (such as, a gas pipe line system), to establish a topological connectivity of the delivery system. Data sources, which are identified using flow measurements and pressure measurements, are processed (for example, using outlier removal, smoothing, and short spike removal). The processed data is used to identify connectivity and temporal lags between measurement nodes in the delivery system, such as by identifying unique pairwise delays, and composing the pairwise delays into a topology tree that represents the topological connectivity. The measurements are used to determine the topological connectivity. The temporal delays that are obtained are also used to estimate a relative distance between measurement nodes in the network.

A physical delivery system includes multiple stations interconnected by a pipeline network to deliver goods, such as fluids, from one station, such as a supply station, to one or more stations, such as destination stations, in the delivery system. For example, the delivery system may deliver fluids such as water, oil, compressed gas, or any other fluid. The examples throughout the present disclosure describe a delivery system that delivers compressed gas, however it will be obvious to a person skilled in the art that the technical solutions are applicable to a physical delivery system irrespective of the substance that the delivery system is transporting.

Typically, operators monitor the delivery system using a supervisory control and data acquisition (SCADA) system. The SCADA system may visualize the physical delivery system as a network of stations and the interconnecting pipelines, wherein the visualization is based on the operator manually identifying the connections between the stations. The SCADA system may be connected to one or more measurement sensors that measure attributes of the transportation of the fluid in the delivery system. For example, the sensors may measure flow-rate, pressure, volume, or any other attribute of the flow of the fluid through the delivery system. The sensors may be located at one or more stations. Alternatively or in addition, the sensors may be located on the pipeline network, between the stations. Throughout the present disclosures, the examples consider that the sensors are located at the stations in the delivery stations. However, it will be obvious to a person skilled in the art that the technical solutions are applicable to the sensors irrespective of where the sensors are located in the delivery system.

The technical solutions described herein monitor the measurements from the sensors over a predetermined duration of time and automatically identify the topological connectivity of the delivery system. In addition, the technical solutions facilitate identification of relative distance between the sensors, and in turn the stations.

FIG. 1 illustrates an example fluid-delivery pipeline network 10. The pipeline network 10 comprises multiple stations, each station 12 connected with at least one other station 12 via a pipeline that carries fluid between the stations. In an example, as illustrated, sensors at each station 12 acquire measurements 15. The measurements 15 may be transmitted for reception by a server 20 over a communication network 165. The server 20 may store the measurements 15 from each station 12 in a data repository 30.

The station 12 in the pipeline network 10 may be a supply station, a destination station, or a combination thereof. For example, a supply station (such as $X_{TIF}$) forwards fluid received to one or more other stations in the pipeline network 10. A destination station (such as $X_{ALM}$) receives the fluid via the pipelines for using the fluid, without forwarding any fluid to other stations. A combination station may receive the fluid, out of which a part may be used at the station and the rest forwarded to other stations.

The station 12 may include a compressor, a fork, or any other equipment to direct the flow of the fluid via the pipeline network 10. In addition, the station 12 may be equipped with sensors to acquire the measurements 15, such as a volume, a flow-rate, a pressure, or any other attribute of the fluid received at the station 12 and/or the fluid being transported from the station 12. The station 12 may further be equipped with transmitters to transmit the measurements 15. In another example, the sensors may be equipped for the transmission of the measurements 15.

The server 20 may receive the measurements 15 and store the measurements from each station 12 in the data repository 30. The server 20 may store a temporal series of sensor measurements from each station 12 that includes measurements 15 from each station over a predetermined time-span. For example, the temporal series of sensor measurement for station $X_{TIF}$ may include measurements 15 acquired at $X_{TIF}$ over the predetermined time-span, such as fifteen minutes, two hours, three days, two months, or any other time-span. The repository 30 that stores the temporal measurements from each station 12 may be a database, a data warehouse or any other computer readable storage accessible by the server 20. In an example, the data repository 30 may be part of the server 20. In another example, the data repository 30 may be at a remote location relative to the server 20. The server 20 and the data repository 30 communicate over the communication network 165. The communication network 165 may be a wired or a wireless communication network, or a combination of both. The communication network 165 may use a communication protocol such as transmission control protocol/internet protocol (TCP/IP), user datagram protocol (UDP), or any other protocol or a combination thereof.

Figure 2:
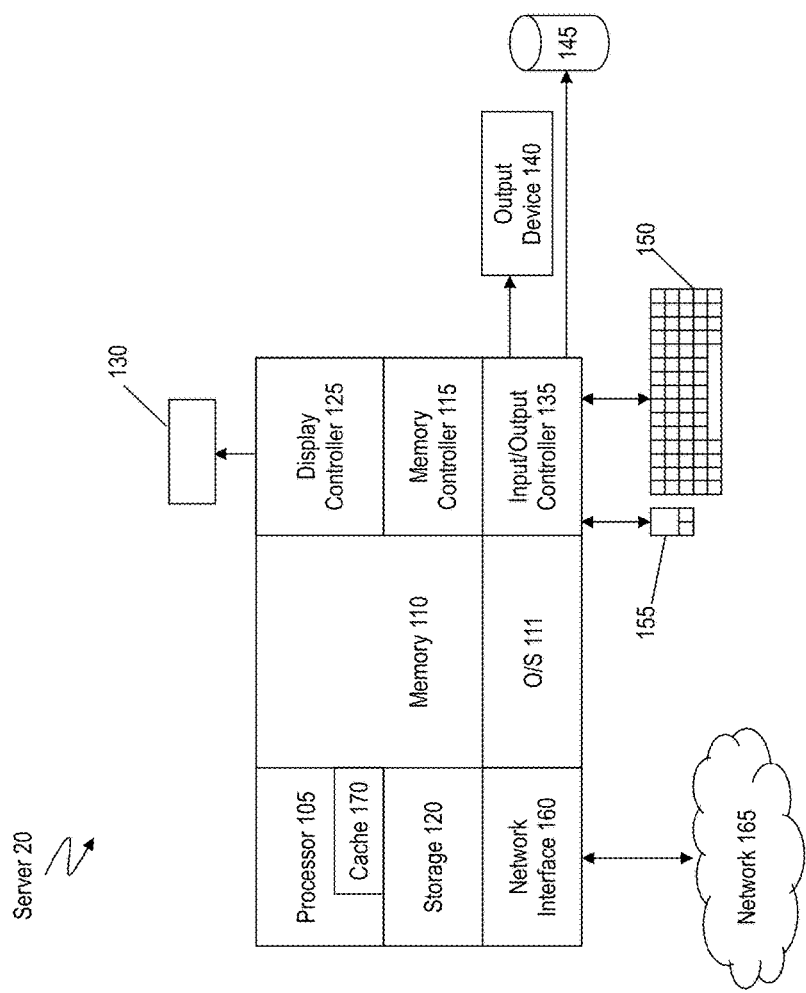
FIG. 2 illustrates an example server, in accordance with an embodiment.

FIG. 2 illustrates an example block diagram of the server 20. The server 20 may be a communication apparatus, such as a computer. For example, the server 20 may be a desktop computer, a tablet computer, a laptop computer, a phone, such as a smartphone, a server computer, or any other device that communicates via the network 165. The server 20 includes hardware, such as electronic circuitry.

For example, the server 20 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (such as an altimeter, an accelerometer, a global positioning satellite receiver), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the server 20, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The server 20 may further include a display controller 125 coupled to a user interface or display 130. In some embodiments, the display 130 may be an LCD screen. In other embodiments, the display 130 may include a plurality of LED status lights. In some embodiments, the server 20 may further include a network interface 160 for coupling to a network 165. The network 165 may be an IP-based network for communication between the server 20 and an external server, client and the like via a broadband connection. In an embodiment, the network 165 may be a satellite network. The network 165 transmits and receives data between the server 20 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

The server 20 may be part of a supervisory control and data acquisition (SCADA) system. Typically, there is no topological relationship in the SCADA system; therefore, the technical solutions facilitate the SCADA system to obtain, in an automated manner, a physical/topological network of the pipeline network 10 by mapping of the measurements 15 between the stations of the pipeline network 10. The technical solutions determine the topological network based on the measured physical properties of the fluid being delivered, such as, pressure, flow rate, by identifying a time delayed effect from one station in the pipeline network 10 to a connected station in the pipeline network 10. In an example, the delayed effects may be statistically evaluated to automate the process of mapping the measurements 15 to the topological network.

Figure 3:
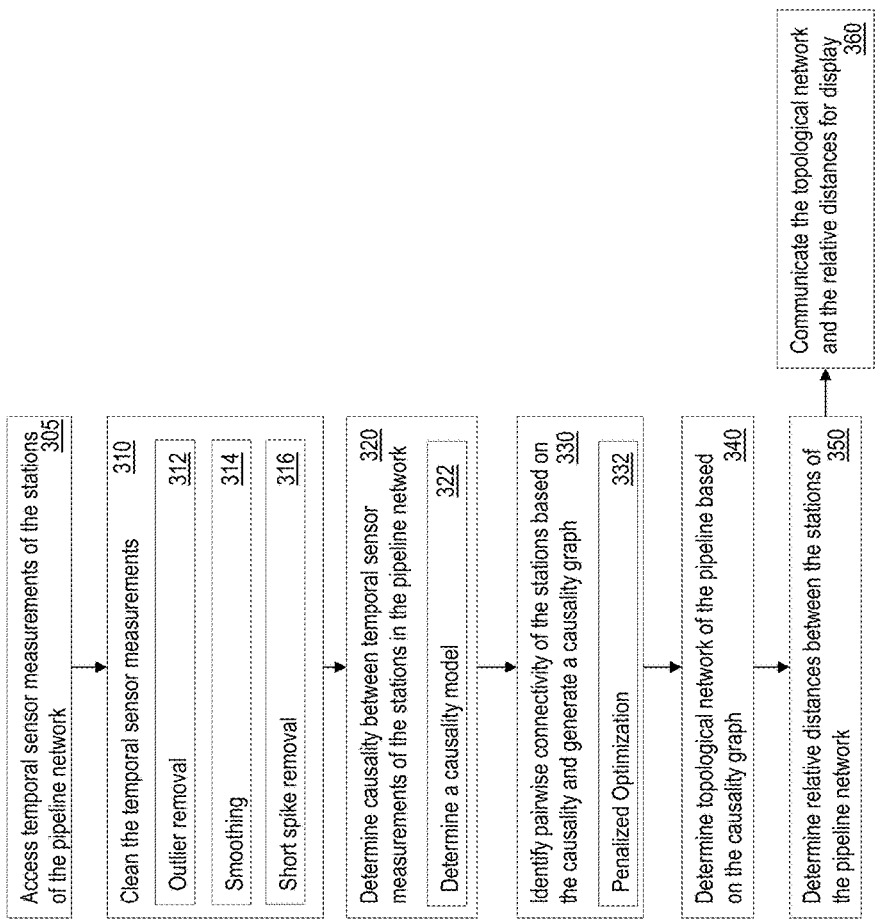
FIG. 3 illustrates a flowchart of example logic to determine topological network of a pipeline network, in accordance with an embodiment.

FIG. 3 illustrates a flowchart for the server 20 to determine the topological network of the pipeline network 10. The server 20 receives or accesses the temporal sensor measurements of the stations of the fluid-delivery pipeline network, as shown at block 305. For example, the server 20 receives the measurements 15 from the sensors at the stations, or alternatively accesses the measurements 15 from the data repository 30. The server 20 cleans the data in the measurements 15 in preparation of determining the topological network of the pipeline network 10, as shown at block 310. For example, the cleaning may include removal of outliers in each temporal series of respective stations, as shown at block 312. In addition or alternatively, the server 20 may smooth each temporal series of sensor measurements, as shown at block 314. In addition or alternatively, the server 20 may remove short spikes from each series of sensor measurements, as shown at block 316. In addition or alternatively, the server 20 may perform other data cleaning operations on the temporal sensor measurements in other examples.

Figure 4:
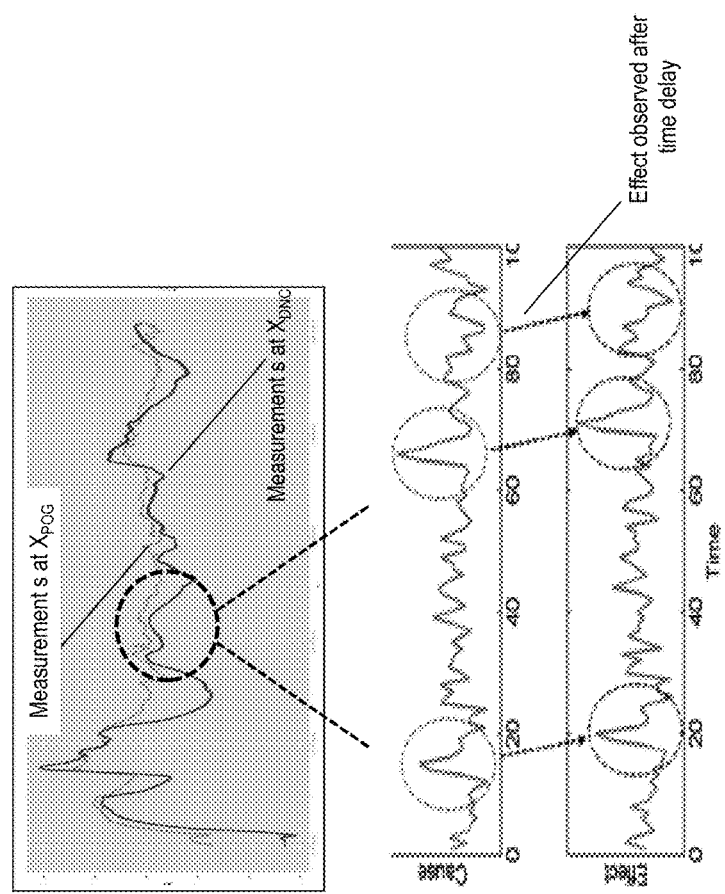
FIG. 4 illustrates an example cause-effect relationship among temporal sensor measurements captured at a pair of stations, in accordance with an embodiment.

The server 20 further analyzes the temporal sensor measurements to determine causality between temporal sensor measurements of the stations in the pipeline network 10, as shown at block 320. For example, the server 20 analyzes the temporal sensor measurements of the stations in a pairwise manner, to identify if measurements 15 observed at a first station affect the measurements 15 at a second station. For example, as illustrated in FIG. 4, if a compressor operation at an upstream station, such as $X_{POG}$ (see FIG. 1), may have an effect at a downstream station, such as $X_{DN}$. As illustrated in FIG. 4, the effect at the downstream station may be observed after a time delay, for example due to the time taken by the fluid to flow to the downstream station.

For example, the server 20 determines a causality model using the multiple series of measurement data from each of the stations, as shown at block 322. For example, the causality model may be determined based on multivariate regression, such as using Granger model, in which given P number of time series, $X_1$-$X_P$, the model may determine each time series $X_i$ that represents the causes. Table 1 illustrates an example causality model.

TABLE 1

$$X_i(t) = \sum_{j=1}^{p} \alpha_{i,j}^T X_j^{t,Lagged} + \epsilon$$

where:
$X_j^{t,Lagged} = [X_j(t - L), \ldots, X_j(t - 1)]$ is the lagged time series
$\alpha_{i,j}^T = [\alpha_{i,j,1}, \ldots, \alpha_{i,j,L}]$ is the coefficient vector.
If any of the $\alpha_{i,j,\{1,\ldots,L\}} \neq 0 \Rightarrow X_j \rightarrow X_i$
possible challenges: for high dimensional data, when L is large, we have p × L number of features in the regression, it is possible that the model picks up smalle causal effects. Therefore, it is important to have some penalization so that the causal relationship is most significant.

Thus, the server 20 computes a plurality of temporal lags $X_j(t)$ and corresponding coefficients $\alpha_j$, such as using multivariate regression analysis using L1 penalty. The server identifies the temporal lag $X_k(t)$ that has the maximum corresponding coefficient $\alpha_k$. The identified temporal lag $X_k(t)$ is then used in subsequent computations and identification of the temporal connectivity of the pipeline network.

The server 20 further identifies pairwise connectivity of the stations based on the causality, and generates a causality graph, as shown at blocks 330. For example, the server identifies a penalization model to filter the causality relationships identified, as shown at block 332. For example, the penalization model may be based on one of several techniques such as a Grouped-Lasso-Granger, a Lasso regression, or a Grouped-Lasso regression, among others. Table 2 illustrates models of example penalization models.

TABLE 2

Grouped-Lasso-Granger
Grouped-Lasso ($l_1$) penalty is used to obtain a sparse graph structure:

$$\min_{\{\beta\}} \sum_{t=L+1}^{T} \sum_{i=1}^{p} \| X_i(t) - \sum_{i=1}^{p} \beta_{i,j}^T X_j^{t,Lagged} \|_2^2 + \lambda \sum_{i=1}^{p} \| \beta_i \|_1$$

Lasso regression uses $l_1$ penalty, which tend to "push" coefficients to zero, therefore, arrives at a sparse structure, capturing the most important temporal dependency between time series. Grouped-Lasso regression penalize the sum of the coefficnets of lagged series from one time series, therefore will arrive at a sparse structure in pair-wise causal graph. In other words, we can reduce the number of non-zero coefficients on the casual effect from one time series to effect time series, thus reduce multiple temporal causality problem.

Based on the causality model and the penalization model, the server 20 generates a causality graph of the temporal sensor measurements. The causality graph includes a set of nodes and a set of links. The nodes are representative of the stations of the pipeline network 10. A pair of nodes in the causality graph is connected by a link in response to the corresponding pair of stations being temporally dependent. The causality graph is non-cyclical.

Figure 5:
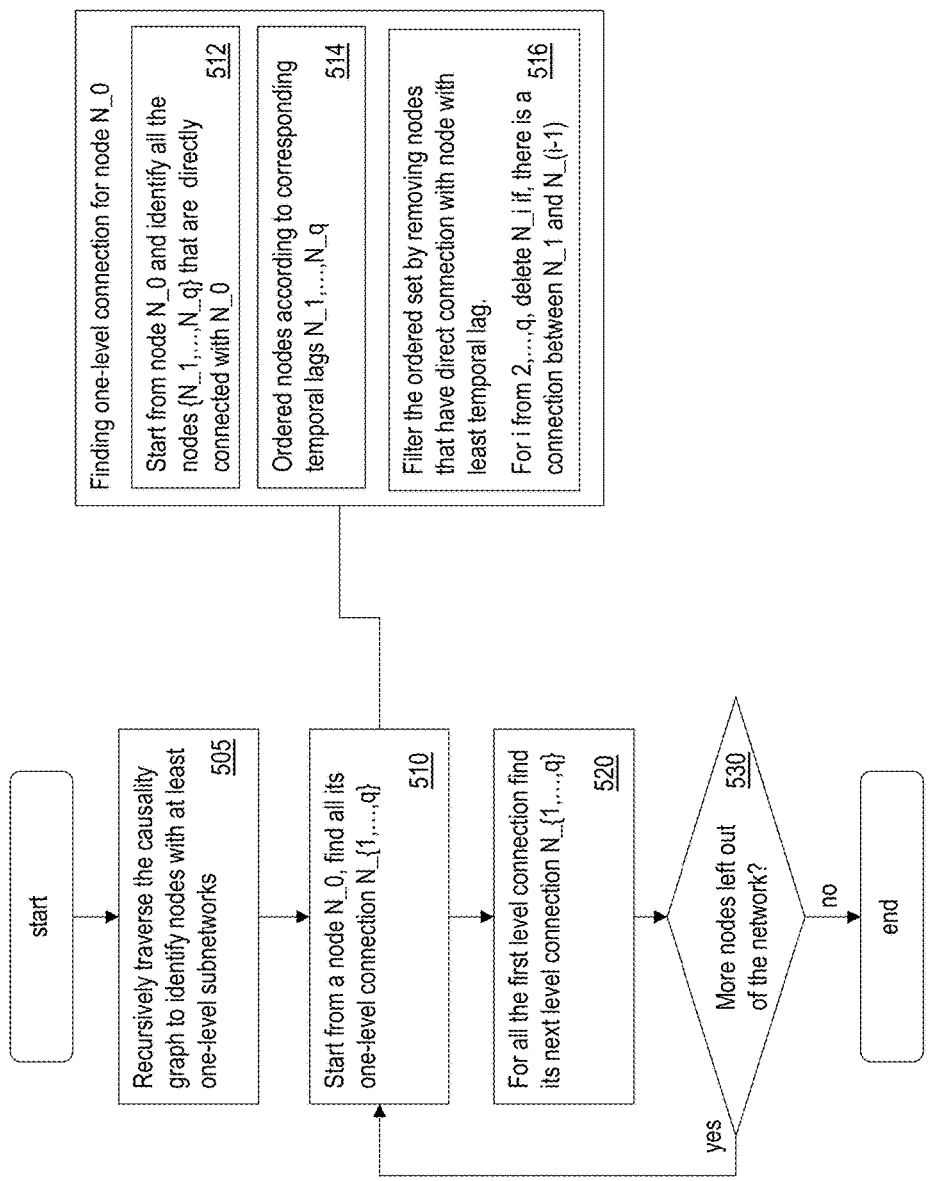
FIG. 5 illustrates a flowchart of example logic to convert a causality graph into a topological network, in accordance with an embodiment.

Referring back to FIG. 3, the server determines a topological network of the pipeline network 10 based on the causality graph, as shown at block 340. FIG. 5 illustrates a flowchart of determining the topological network of the pipeline network 10 based on the causality graph. The server 20 traverses the causality graph recursively to identify nodes with at least one-level subnetworks, as shown at block 505. A node with at least one-level subnetwork is a node that is connected to at least one other node that corresponds to a downstream station. The server 20 further selects a node from the nodes with at least one-level subnetworks and identifies the first-level connections of that node, as shown at block 510. The first level connections are direct connections. For example, in FIG. 6, in the illustrated causality graph 620, $X_2$ is a first-level connection of the node $X_3$, while $X_1$ is a second-level connection of $X_3$. Referring back to FIG. 5, consider that the selected node is N_0 with a set of first-level connections {N_1, N_2, ... N_q}. The set of first-level connections is identified by starting at N_0 and traversing the causality graph to identify a node that is directly linked with N_0, as shown at block 512. Once a node is identified as being directly linked with N_0, the server 20 adds the node to the set of first-level connections corresponding to N_0. The server 20 ranks the nodes in the set of first-level connections according to temporal lags of the nodes, as shown at block 514. Thus, the set of first-level connections {N_1, N_2, ... N_q} includes nodes that are ordered according to the temporal lags. In an example, the ordering may be in an increasing manner, thus N_1 has least temporal lag in the ordered set. In another example, the ordering may be in decreasing manner, in which case N_q has the least temporal lag. The server filters the set of first-level connections {N_1, N_2, ... N_q} by removing nodes in the set that have a direct connection with the node with the least temporal lag, as shown at block 516. For example, for all the nodes N_i, where i is from 2 to q, the server deletes N_i from the ordered set {N_1, N_2, ... N_q}, if there is a connection between N_1 and N_(i−1).

The server 20 further recursively repeats the process for all the nodes in the set of first-level connections {N_1, N_2, ... N_q}, as shown at block 520. The server 20 ensures that all the nodes in the causality graph are analyzed in this manner, as shown at block 530. The resulting first-level connection sets for each respective node in the causality graph is the temporal connectivity of the pipeline network 10 according to pairwise causality among the stations in the pipeline network 10.

Referring back to FIG. 3, the server 20 determines relative distances between the stations of the pipeline network 10 based on the topological network, as shown at block 350. For example, the relative distances may be the temporal lags of the nodes in the topological network. In an example, the relative distance of a node may be a scaled value based on the temporal lag of that node and a predetermined scaling value. The server 20 further communicates the topological network and/or the relative distances for display, as shown at block 360.

Figure 6:
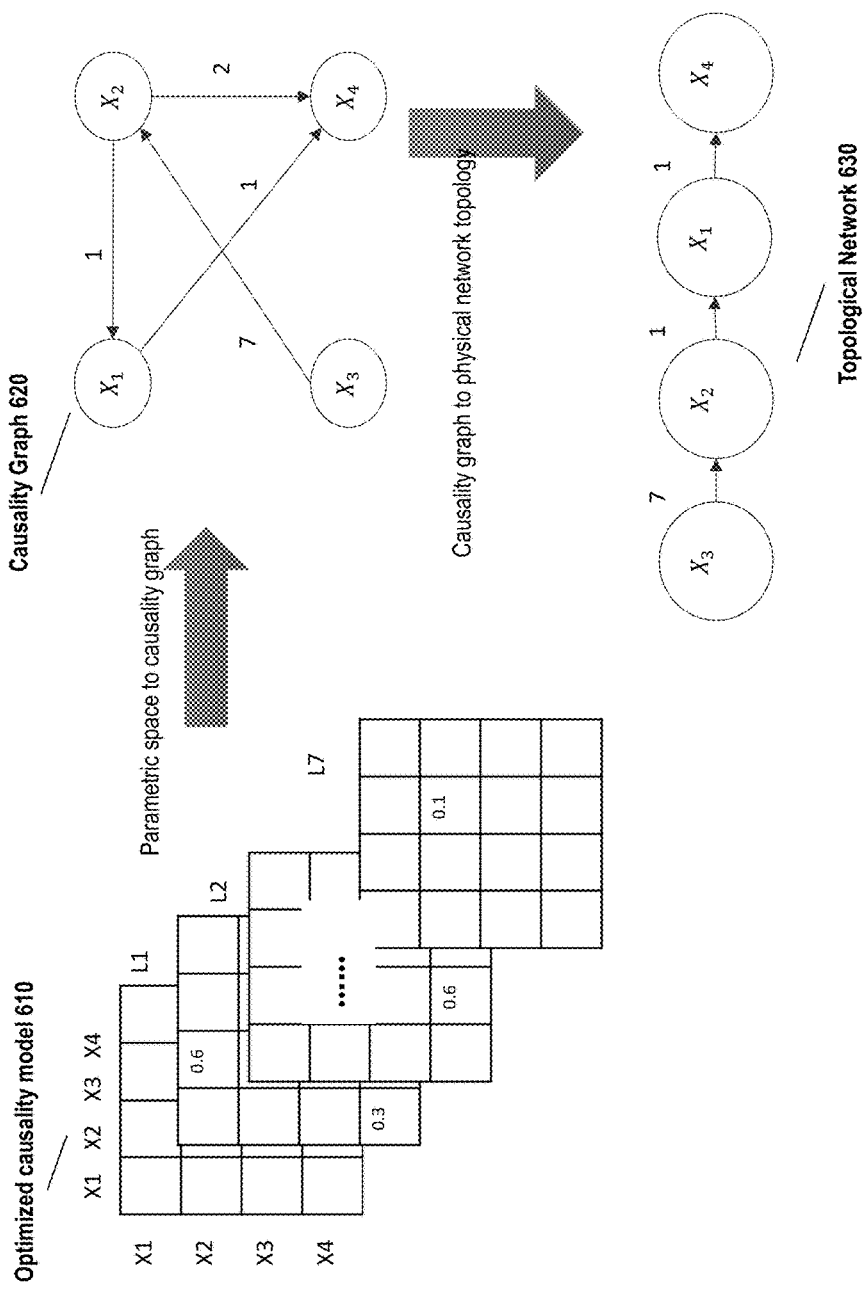
FIG. 6 illustrates an example scenario of determining a topological network of an example pipeline network, in accordance with an embodiment.

FIG. 6 illustrates an example scenario of determining the topological network. In the example scenario, consider a pipeline network with four stations—$X_1$, $X_2$, $X_3$, and $X_4$. The server 20 generates an optimized causality model 610 based on the temporal sensor measurements captured at each station. The server 20 identifies pairs of stations that have a cause-effect relationship according to the temporal sensor measurements. The server 20 accordingly populates a causality graph 620. The server 20 associates a temporal lag with each link in the causality graph 620. The temporal lag represents a time delay for a change in temporal sensor measurements at a first node to reflect in the temporal sensor measurements at a second node. The server 20 further determines a topological network 630 of the exemplary pipeline network of the four stations.

Figure 7:
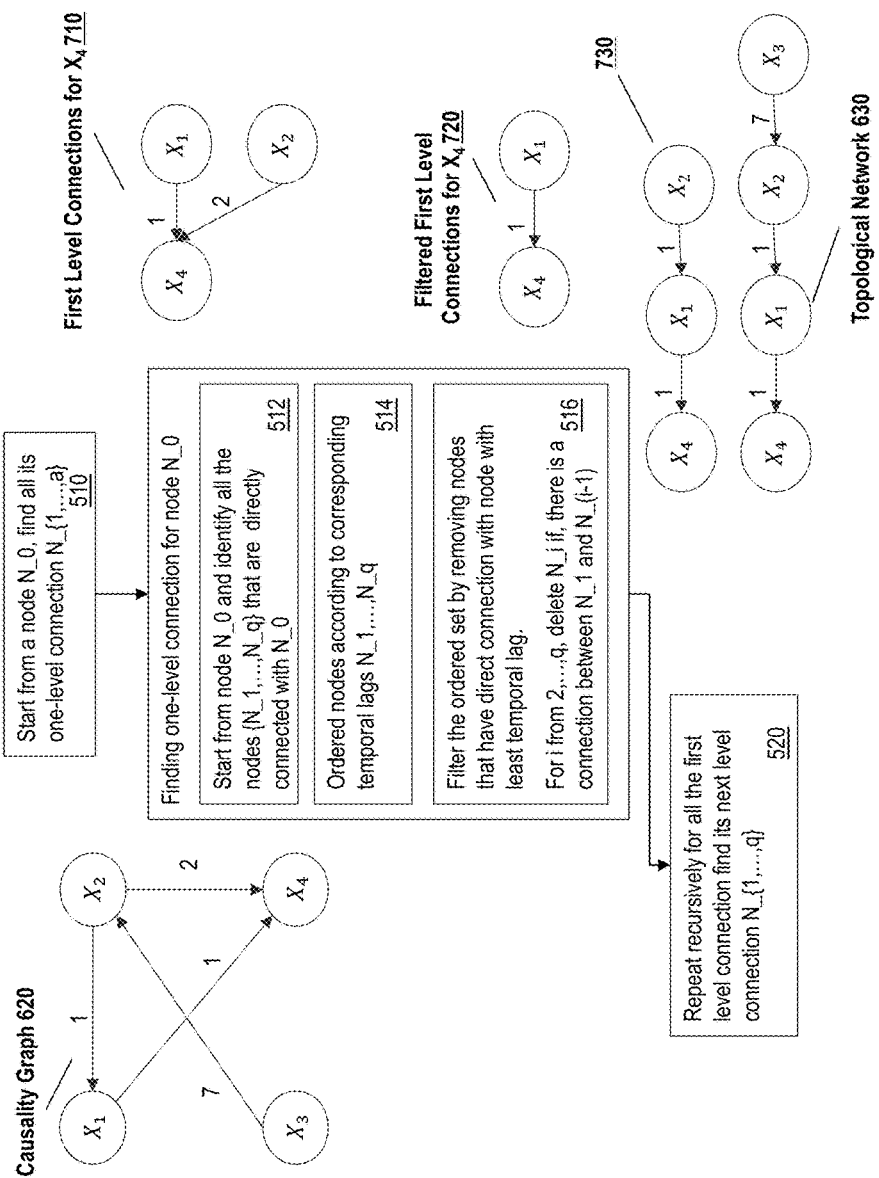
FIG. 7 illustrates an example scenario of determining a topological network from an example causality graph, in accordance with an embodiment.

FIG. 7 illustrates determining the topological network 630 from the causality graph 620 from the example scenario of FIG. 6 according to the flowchart illustrated in FIG. 5. For example, the server selects node $X_4$ as the starting node N_0, as shown at block 510. In an example, the node $X_4$ is selected because the node is sequentially the first supply node of the pipeline network. The set of first-level connections for $X_4$ includes the nodes $X_1$ and $X_2$, as shown at 710. The server 20 keeps track of the temporal lag associated with the nodes identified. The server 20 filters the first level connections for $X_4$ 710 to generate a filtered first level connections for $X_4$ 720. The filtered first level connections for $X_4$ 720 does not include the node $X_2$, which the server filters since $X_2$ is directly connected to $X_1$, which is the node with the least temporal lag in the first level connections for $X_4$ 710. The server 20 repeats the process recursively for all the first level connections 710 to find next level connections, such as shown at 730, until all nodes are analyzed and the resulting topological network 630 is obtained and displayed.

Figure 8:
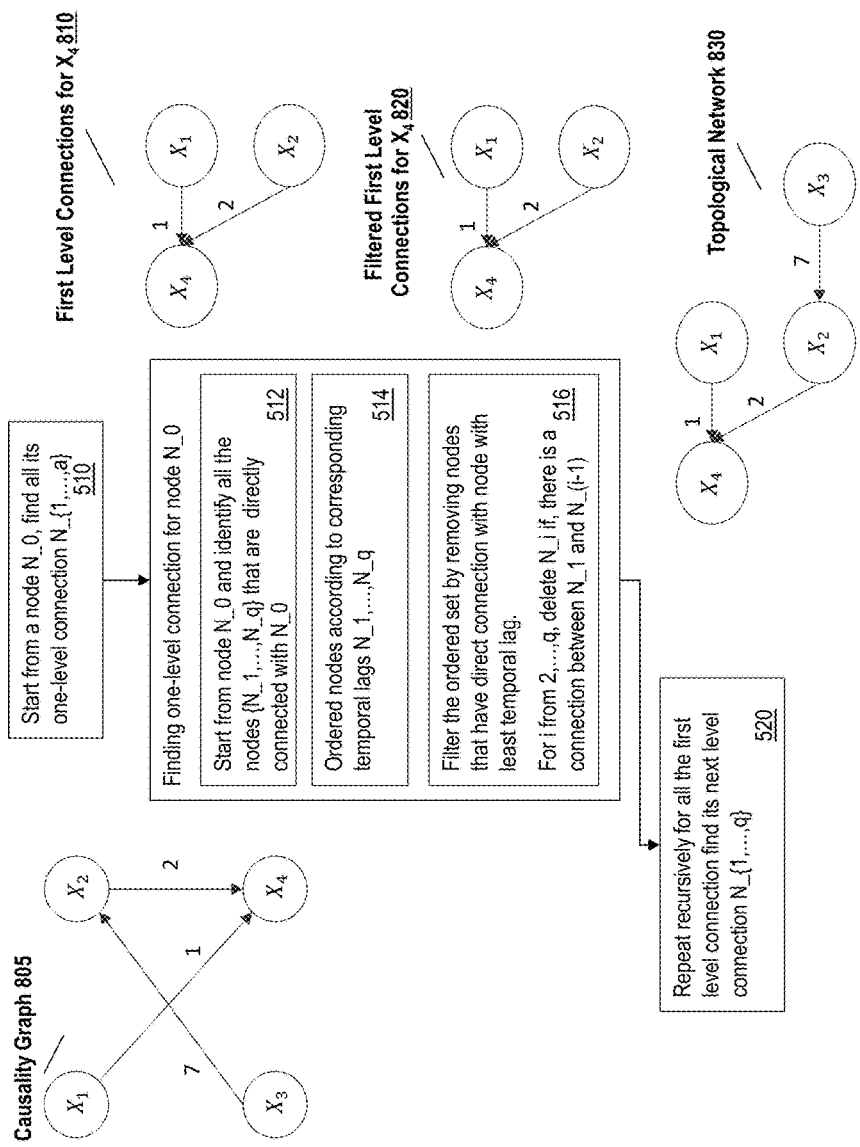
FIG. 8 illustrates an example scenario of determining a topological network from an example causality graph, in accordance with an embodiment.

FIG. 8 illustrates determining a topological network 830 from a causality graph 805 based on the example scenario of FIG. 6 according to the flowchart illustrated in FIG. 5. A difference between the causality graph 805 in this second example from the causality graph 620 of the previous example is that the nodes $X_1$ and $X_2$ are not directly connected in this example. Again, the server 20 selects the node $X_4$ as the starting node N_0 and identifies a set of first-level connections for $X_4$ 810 that includes the nodes $X_1$ and $X_2$. The server 20 further filters the set to determine a set of filtered first level connections for $X_4$ 820. As indicated earlier, in this example, the filtering does not remove any node from the set of first-level connections for $X_4$ 810. Accordingly, after recursively repeating the process for each node in the causality graph 805, the server 20 determines the topological network 830.

Figure 9:
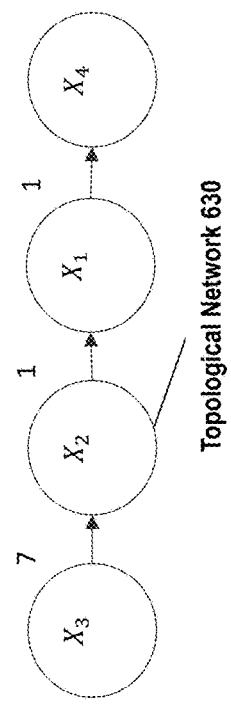
FIG. 9 illustrates an example scenario of determining relative distances in the stations of a pipeline network from a topological network, in accordance with an embodiment.

FIG. 9 illustrates determining relative distances between the nodes in the topological network. The temporal lag associated with the links of the nodes added to the set of first-level connections may be used to determine the relative distance. As illustrated in the example of FIG. 9, the temporal lags are used as the relative distance itself. Alternatively, the temporal lags may be scaled by a predetermined value to obtain the relative distances.

Thus, the technical solutions describe determining a causality model, such as based on Granger/Lasso models, for identifying pairwise delays in stations in a fluid-delivery pipeline network, and using the causality model to convert the pairwise delays into a topology tree of the pipeline network. Further, based on the pairwise delays, relative distances between the stations may be determined.

Forecasting Linepack Delay in a Pipeline Network

The technical solutions described herein further facilitate determining the temporal delays between the stations in the pipeline network 10, and further estimating a linepack delay in the pipeline network 10 based on the identified temporal delays. Linepack is the amount of fluid maintained in the pipeline network 10 to maintain a predetermined pressure in the pipeline network 10. The technical solutions facilitate estimating the linepack delays in non-monitored pipeline networks, or portions thereof. Such forecasts facilitate a compressor station to pump fluid, such as gas ahead of the a demand occurrence at a delivery station, thus overcoming a time delay between supply and delivery stations in case of compressible fluid, such as natural gas. Accordingly, the technical solutions facilitate improving an operation of a pipeline network, such as a high-pressure gas transmission system to meet the demand at delivery stations in the transmission system.

In the high-pressure gas transmission system, it is important for an operator to have information on the temporal delay to scale changes of linepacks at one point to another connected point for planning purposes. The technical solutions described herein facilitate computing the linepack cascading effect on connected nodes in the gas transmission system. Further, the technical solutions facilitate computing the linepack cascading effect in a gas transmission system that may not be equipped with a SCADA system. In an example, the technical solutions include computing delayed effects in a SCADA equipped gas transmission system and using machine-learning techniques to determine a model between a geo-spatial distance, flow-rate, and pressure with linepack temporal delay effect. The model is subsequently used to predict the linepack effect on a gas transmission system that is not SCADA monitored, and further used to forecast the linepack effect on cascading systems. In another example, the model is used to predict the linepack effect on the gas transmission that is configured in a different way. For example, the model is used to predict an effect on the linepack delay if pressure, temperature, frequency of rotations, or any other parameter at a specific station in the gas transmission is changed.

Figure 10:
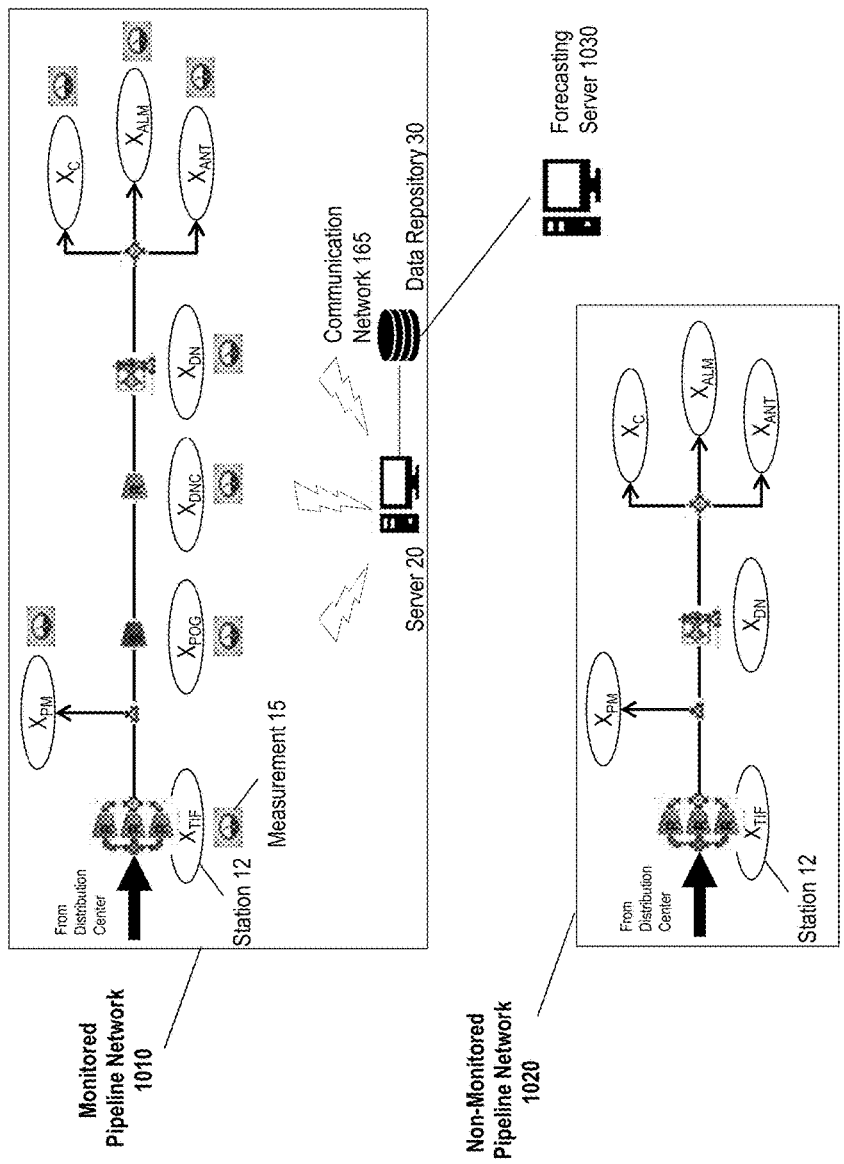
FIG. 10 illustrates a system for forecasting linepack delays, in accordance with an embodiment.

FIG. 10 illustrates a system to forecast linepack delays in a non-monitored pipeline network. The system includes. Among other components, a forecasting server 1030 and two fluid-delivery pipeline networks, a monitored pipeline network 1010 and a non-monitored pipeline network 1020. The monitored pipeline network 1010, which may be similar to the pipeline network 10 described herein, includes the measurement sensors and the server 20, which may be part of a SCADA system that monitors the measurements 15 of pipeline network 1010. The non-monitored pipeline network 1020 is similar to the pipeline network 10 or the monitored pipeline network 1010 in other respects except that the non-monitored pipeline network 1020 does not include sensors and/or a server to monitor measurements at stations of the non-monitored pipeline network 1020. In FIG. 10, the monitored pipeline network 1010 and the non-monitored pipeline network 1020 are illustrated to different structure of the respective stations. However, in an example, the two pipeline networks may have same structure of the stations. In another example, the non-monitored pipeline network 1020 may be a portion of the monitored pipeline network 1010, where the non-monitored pipeline network 1020 is the portion that does not include measurement sensors or which is not yet connected to communicate with the server 20. Alternatively or in addition, the non-monitored pipeline network 1020 may be a new pipeline network that does not have measurements 15 captured for at least threshold duration.

The amount of gas being transferred by the monitored pipeline 1010 and the non-monitored pipeline network 1020 may be the same, in an example. In another example, the monitored pipeline 1010 and the non-monitored pipeline network 1020 may transport different amounts of gas. In yet another example, the monitored pipeline 1010 and the non-monitored pipeline 1020 are identical in physical dimensions, such as pipeline diameters, lengths, elevation, and other aspects. The non-monitored pipeline 1020 may differ from the monitored pipeline 1010 in one or more of the other parameters, such as the compression at the compressor stations, amount of gas being transferred, compression ratio of the fluid transferred, the frequency of rotations at the compressor stations, flow-rate at the stations, or any other such measurement. The server 20, based on the model generated using the monitored pipeline network 1010, predicts the linepack delays in the non-monitored pipeline 1020, with identical physical dimensions, but different parameters.

The forecasting server 1030 is a server computer similar to the server 20 and includes at least the components of the server 20 as illustrated in FIG. 2. The forecasting server 1030 may access the data repository 30 that includes the temporal sensor measurements from the stations of the monitored pipeline network 1010. In an example, the forecasting server 1030 and the server 20 may be one and the same.

Figure 11:
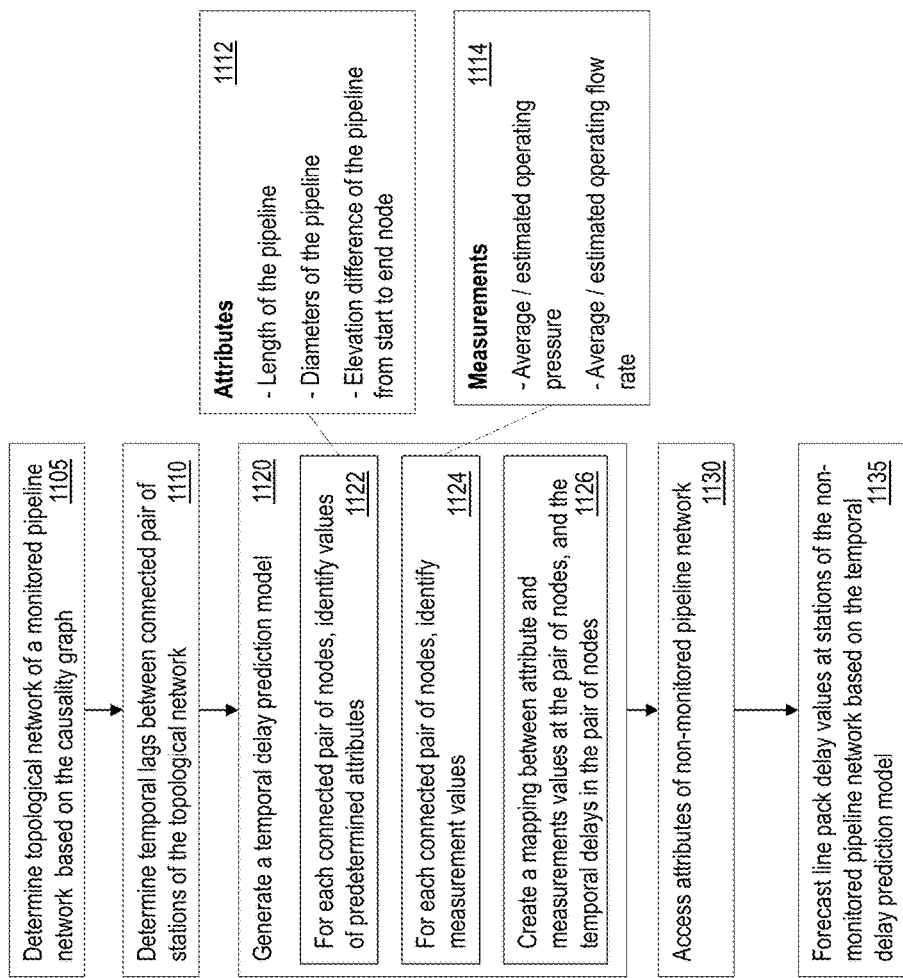
FIG. 11 illustrates a flowchart of example logic for forecasting linepack delays, in accordance with an embodiment.

FIG. 11 illustrates a flowchart for forecasting the linepack delay in the non-monitored pipeline network 1020. The forecasting server 1030 determines a topological network of the monitored pipeline network 1010 based on a causality graph for the stations in the monitored pipeline network 1010, as shown at block 1105. In another example, the forecasting server 1030 accesses the topological network of the monitored pipeline network 1010 from the data repository 30, where the server 20 determines and stores the topological network in the data repository 30. The forecasting server 1030 further determines (or accesses) the temporal delays (or lags) between each connected pair of stations from the topological network of the monitored pipeline network 1010, as shown at block 1110. The topological network and the temporal logs of the monitored pipeline network 1010 may be determined as described herein, such as according to the flowchart illustrated in FIG. 3.

The forecasting server 1030 generates a temporal delay prediction model based on the topological network and the relative distances of the monitored pipeline network 1010, as shown at block 1120. In an example, the forecasting server 1030 uses topological network and relative distances from more than one monitored pipeline network to generate the temporal delay prediction model. Generating the temporal delay prediction model may be based on machine learning techniques such as gradient boosting machine or any other machine learning technique. In an example, the forecasting server 1030, for each connected pair of nodes in the topological network of the monitored pipeline network 1010, identifies values of a set of predetermined attributes 1112, as shown at block 1122. For example, the predetermined attributes 1112 may include a length of the pipeline between the pair of nodes, a diameter of the pipeline, an elevation difference of the pipeline between the pair of nodes, or the like. The forecasting server 1030 may further compute a set of predetermined values 1114 based on the temporal sensor measurements of each connected pair of nodes in the topological network of the monitored pipeline network 1010, as shown at block 1124. The predetermined values 1114 may include an average operating pressure, an average operating flow rate, or the like or a combination thereof.

The forecasting server 1030 creates a mapping between temporal delays between a pair of connected stations of the topological network of the monitored pipeline network 1010 and the corresponding values of the predetermined attributes 1112 and predetermined measurements 1114, as shown at block 1126. For example, the forecasting server 1030 maps the geo-spatial distance, average flow rate, and/or average pressure with the temporal delay between a pair of connected stations of the topological network of the monitored pipeline network 1010. For example, the forecasting server 1030 maps the temporal delay between a pair of stations of the monitored pipeline network 1010 to the corresponding values of the predetermined attributes 1112 and measurements 1114. The forecasting server 1030, based on multiple such mappings for multiple pairs of stations in the monitored pipeline network 1010, identifies a relationship between the temporal delays and the corresponding predetermined attributes and measurement values.

The forecasting server 1030 accesses attributes of the non-monitored pipeline network 1020, as shown at block 1130. In an example, the forecasting server 1030 receives the attributes of the non-monitored pipeline network 1020 via a communication network. The attributes of the non-monitored pipeline network 1020 includes attributes of the stations of the non-monitored pipeline network 1020. The attributes include one or more of the predetermined attributes 1112, such as a length of the pipeline between the pair of nodes, a diameter of the pipeline, an elevation difference of the pipeline between the pair of nodes, or the like.

The forecasting server 1030 forecasts linepack delays at the stations of the non-monitored pipeline network 1020 based on the temporal delay prediction model, as shown at block 1135. For example, for a first pair of stations in the non-monitored pipeline network 1020, the forecasting server 1030 identifies a second pair of stations from the monitored pipeline network 1010 with matching attributes 1112. Accordingly, the forecasting server 1030 maps the temporal delays of the second pair of stations with the first pair, and forecasts temporal delays similar or identical to those associated with the first pair of stations. In another example, the forecasting server 1030 uses the relationships identified between the temporal delays and the attributes 1112 and the measurements 1114, from the monitored pipeline network 1010, to forecast the temporal delays in the non-monitored pipeline network 1020.

In a pipeline network that is transporting a highly compressible fluid such as natural gas, the temporal delays are representative of the linepack delays in the high-pressure gas transmission system. A 'linepack' is an amount of gas in the high pressure gas transmission system, for example, the amount of gas maintained in the gas transmission system at all times to maintain pressure and effect uninterrupted flow of gas through the pipeline network 10. To meet an expected demand for gas, a compressor station pumps gas ahead of the demand occurrence. The forecasting server 1030, by forecasting linepack delays, facilitates the compressor station to meet the expected demand while maintaining the linepack according to compliance values.

Accordingly, the technical solutions described herein facilitate using machine learning techniques, such as gradient boosting, to determine a mapping function between a set of features, such as geo-spatial distance, average flow rate, average pressure, with temporal delay of the linepacks in the high pressure gas transmission system. The mapping function is determined based on temporal sensor measurements from a monitored pipeline network. The technical solutions further facilitate applying the mapping function to predict linepack delay effects on a pipeline network that is not being SCADA monitored.

Forecasting Leaks Caused by Ruptures in Pipeline Network

The pipeline network 10 may be part of a complex system such as a high pressure gas pipeline system, which transports fluid that is unsteady, and has a compressible flow, with frequent compressor operations. In such a pipeline network, the flow is not unidirectional as a compressor station may serve multiple close-by locations. Additionally or alternatively, the flow direction of the fluid may change due to a scheduled operation, pigging, or an unanticipated leak event. In an example, the nature of compressibility of the fluid (such as gas) and fluid dynamics, there is a temporal lag for any change at one location to take effect on connected locations at different speed under different operation conditions. The temporal lag may lead to measurement errors. For example, flow measurements may show high frequency oscillations and/or short spikes. The accuracy of the flow measurements may vary based on the magnitude of the flow. Since accurate flow measurement is difficult, using principles such as of "mass conservation" to detect a leak in the pipeline network 10, such as transporting high-sure gas. In addition, some measurements may not be available from each station in the pipeline network 10. Further yet, the flow in the pipeline network 10 may be unpredictable due to sudden, unplanned demands such as from commercial loads like gas turbines in electric plants, potato plants, or the like. Additionally or alternatively, the flow in the pipeline network 10 may be unpredictable due to weather conditions, such as storms, hurricanes, floods, and the like. Accordingly, accurately predicting a flow pattern in the pipeline network 10 is difficult.

The technical solutions described herein facilitate leak detection for the pipeline network 10, such as a high-pressure gas transmission network. Although the examples described herein use a high-pressure gas transmission network, it will be obvious to a person skilled in the art that the technical solutions embodied by the examples are applicable to any other pipeline network. The technical solutions determine topological connectivity and relative distance from temporal sensor measurements of a high-pressure gas transmission system; estimate temporal delays of linepacks between connected delivery points in the high-pressure gas transmission system; and forecast leaks in the high-pressure gas transmission system. The leaks may be caused, for example, by a rupture of the gas pipeline infrastructure. In another example, the leaks may be caused by small damage to the pipeline network, which over an extended period of time, such as days, weeks, months, or any other period of time, leads to a rupture event. The technical solutions forecast the leaks based on identification of patterns in the temporal sensor measurements captured at the stations in the high-pressure gas transmission system. Accordingly, the technical solutions facilitate a real-time leak detection, to prevent rupture leak events in the future.

Typically, a SCADA uses a single point of reference to determine a leak in the pipeline network 10. The technical solutions described, facilitate an improved technique for forecasting a leak (and thus, in turn a rupture) by taking into account an interaction between difference measurements, and from different stations.

Figure 12:
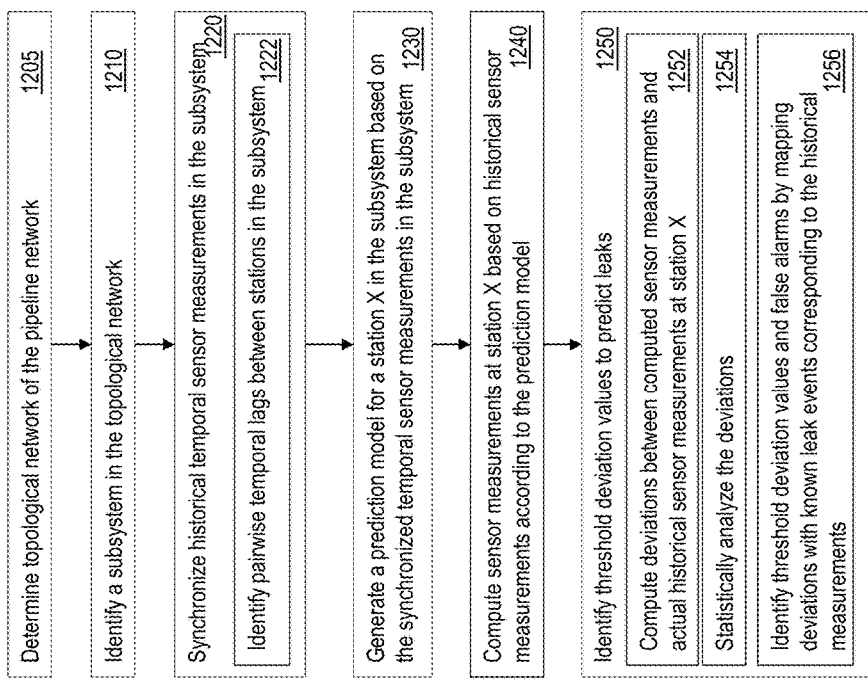
FIG. 12 illustrates a flowchart of example logic for detecting a leak caused by a rupture in a pipeline network, in accordance with an embodiment.

FIG. 12 illustrates a flowchart for forecasting a leak in the pipeline network 10 based on the temporal sensor measurements. In an example, the server 20 implements the method represented by the flowchart. The server 20 determines the topological network of the pipeline network 10, as shown at bock 1205. For example, the server 20 determines the topological network as described herein (see FIG. 3, for example). The server 20 further identifies a subsystem in the topological network, as shown at block 1210. A subsystem may be a subsection of the pipeline network 10, which includes, for example, topologically connected stations that are within a predetermined distance from each other. In an example, the server identifies a subsystem that includes two stations that are directly connected in the topological network. In another example, the server 20 identifies a subsystem that includes a compressor station and the delivery stations receiving compressed fluid from the compressor station.

The server 20 accesses the historical temporal sensor measurements for the stations in the subsystem and synchronizes the temporal sensor measurements across the subsystem, as shown at block 1220. For example, the server 20 accesses the historical temporal sensor measurements, such as pressure, flow-rate, volume, or any other sensor measurements for the stations from the data repository 30. The historical temporal sensor measurements for a predetermined time-span may be accessed, for example, last six months, last one year, last 30 days, or any other predetermined time-span. In an example, the predetermined time-span is selected such that the pipeline network 10 has experienced one or more leaks due to ruptures of the infrastructure within the selected time-span.

In an example, the server 20 identifies the temporal lags between the temporal sensor measurements of the stations of the subsystem, as shown at block 1222. For example, the server 20 may compute the temporal lags between two stations by finding the max correlation between the two time series values of the temporal sensor measurements at the two stations. For example, the computation may be expressed as, $$\rho_{X,Y} = \text{corr}(X, Y) = \frac{\text{cov}(X, Y)}{\sigma_X \sigma_Y} = \frac{E[(X - \mu_X)(Y - \mu_Y)]}{\sigma_X \sigma_Y}$$

In an example, the temporal lags are computed for each model training.

The server 20 generates a prediction model for each of the stations in the subsystem based on the historical temporal sensor measurements. The prediction model for each station may be unique. In another example, the server 20 generates the prediction models for each station in parallel. For example, the server 20 generates a prediction model for a first station in the subsystem, as shown at block 1230. The prediction model predicts sensor measurements at the first station based on the sensor measurements at each station in the subsystem. Thus, the prediction model determines a relationship between the temporal sensor measurements of the stations in the subsystem, after synchronizing the temporal sensor measurements. For example, if the sensor measurement predicted is pressure, the prediction model determines a multivariate relationship, which may be expressed as in Table 3.

TABLE 3

$P_0 \sim \mathcal{F} \ (f_0, \ldots, f_n, P_1, \ldots, P_n, T, C_0, \ldots, C_n)$ \hfill (5)
where:
n is the number of stations, and measurement points in the subsystem.
$P_0$ is the control variable, i.e., pressure measurements in the subsystem,
$f_0, \ldots, f_n$ are the upstream/downstream flows in the pipe segment
$f_0$ is the flow measurement from the same station as $P_0$
$P_1, \ldots, P_n$ are the pressure measurements at up-stream and down-stream of the pipe segment.
T is the air temperature
$C_0, \ldots, C_n$ are the compressor RPMs.

The relationship F, may be a linear model, which captures conditional distribution of the control variables and the other variables in the subsystem. In another example, the relationship may be non-linear. The server 20 may compensate the measurements from the stations according to the temporal lags between the stations. The server 20 determines the relationship by using machine learning techniques. For example, the server 20 may use a neural network to iterate over the historical temporal sensor measurements from the stations in the subsystem from different time-spans. For example, the server 20 may divide the historical temporal sensor measurements into multiple segments according to predetermined time-spans, such as one week, two weeks, ten days, or any other time-segments. The server 20 may determine relationships $F_1, F_2, \ldots F_n$ for the first station for each time-segment, where the server 20 divides the historical temporal sensor measurements into n segments. The server 20 determines the relationship F for the first station based on the multiple relationships. The server 20 may use other machine learning techniques to determine the relationship F in other examples. The server 20 determines the relationship for each station in the subsystem in this manner.

The server 20 further computes sensor measurements at the stations in the subsystem based on the historical sensor measurements according to the prediction model for the respective station. For example, the server 20 computes predicted sensor measurements for the first station, according to the relationship model F, using the historical temporal sensor measurements of the rest of the station in the subsystem, as shown at block 1240. Thus, the server 20 computes the predicted sensor measurements using the same historical temporal sensor measurements that were used to determine the prediction model. The server 20 compares the predicted sensor measurements with the actual temporal sensor measurements at the first station and computes deviations between the two, as shown at block 1252. For example, the server 20 determines root mean square error (RMSE) between the predicted sensor measurements and the actual sensor measurements at the first station. In an example, the sensor measurements may be pressure, flow-rate, volume, or any other sensor measurements. The server 20, in an example, may plot the deviations over time-span of the historical measurements. The server 20 may statistically analyze the deviation values, such as by fitting a Gaussian distribution, computing a mean, and/or a standard deviation of the deviation values, as shown at block 1254.

The server 20 may identify a threshold deviation from the deviations, such as by computing mean, standard deviation, or a coefficient of variation of the deviation values. In another example, the server 20 may map the deviations with the timestamps corresponding to the historical temporal sensor measurements, as shown at block 1256. For example, if the historical temporal sensor measurements include measurements captured every day for a month, the timestamps may represent each day of the month. In such a case, the server 20 computes the deviations corresponding to each day of the month for which the historical sensor measurements are acquired. Further, server 20 may identify the deviations corresponding to timestamps at which known leak events had occurred. The server 20 may determine a second level deviation, that is a deviation in the deviations, at which the leak events occurred and identify the threshold deviation based on the deviations corresponding to the known leak events.

Further yet, the server 20 may use the second level deviations to reduce false alarms, as shown at block 1256. For example, the threshold deviation that is identified based on statistical analysis of the deviations, such as by computing a mean, or coefficient of variance of the deviation values is fine-tuned by mapping the deviation values with the known leak events. For example, the threshold deviation value is compared with the actual deviation values corresponding to the leak events and the threshold deviation modified to be closer to the actual deviation value, if the threshold deviation would have missed the actual deviation value. For example, if the actual deviation value is smaller than the threshold deviation value, the threshold deviation value may be modified to the actual deviation value. In other words, a minimum (or maximum) of the actual deviation values corresponding to the leak events and the threshold deviation may be used to replace the threshold deviation. Thus, the server 20 finds a threshold deviation value (multiples of standard deviation), that identifies the significant leak events and also minimize false alarms at the same time, as shown at block 1250.

The server 20 may communicate the threshold deviation to the SCADA so that the sensor measurements at the first station may be monitored and if the sensor measurements above (or below) the threshold value is detected, an indication of a leak in the subsystem may be triggered. For example, the indication may be triggered by sending a message to an administrator or other employee monitoring the pipeline network 10. Alternatively, fluid transmission in the subsystem may be stopped temporarily while the leak is detected and repaired. Of course, other actions may be taken in response to the prediction of the leak even by the server 20. Thus, the server 20 facilitates forecasting a leak in the subsystem of the pipeline network 10 based on the temporal sensor measurements of the first station by determining threshold deviation values for the sensor measurements at the first station. In addition, the server 20 facilitates forecasting the leak in the subsystem based on temporal sensor measurements at any of the stations in the subsystem. Further, by forecasting leaks in all the subsystems in the pipeline network 10, the server 20 may predict leaks across the entire pipeline network 10 that are caused by a rupture of the pipeline infrastructure.

In an example, the server 20 uses the pressure measurements at the stations to predict leak events that are caused by ruptures. In another example, the server 20 predicts the pressure measurements at the stations based on pressure measurements, flow-rate measurements, volume measurements, and other measurements at the other stations in the subsystem. In addition, the server 20 may use air-temperature measurements, a number of stations in the subsystem, and a number of rotations, and a frequency of rotations (such as RPM) at compressor stations in the subsystem. The prediction model may further depend differently on measurements from upstream and downstream stations. A first station is referred to as an upstream station in relation to a second station, if the first station supplies fluid to the second station. Alternatively, if the second station supplies fluid to the first station, the first station is referred to as a downstream station in relation to the second station. The prediction model may further depend on compressor energy usage, or any measurement that indicates the operating condition of the compressor or any other station in the pipeline. The above listed measurements and other measurements listed throughout the present disclosure are exemplary, and it will be obvious to a person skilled in the art that other measurements may be used as replacements, alternatives, or in addition in the embodiments of the technical solutions described throughout the present disclosure.

In another example, the server 20 uses a combination of sensor measurements at the stations to predict/detect leak events caused by rupture. For example, the server 20 determines a pressure threshold value for the first station as described herein. Further, the server 20 determines a flow-rate threshold value for the first station in as described herein. The server 20 communicates the two threshold values to the SCADA. Alternatively, the server 20 is part of the SCADA and monitors the sensor measurements across the pipeline network 10. The server 20 may detect that pressure at the first station is lower than the pressure threshold learned from the historical temporal sensor measurements, and a flow-rate is higher than the flow-rate threshold. The server 20 concludes that the lower pressure and high spike in flow indicates that there are leaks happening in the subsystem, and triggers an indication accordingly. Of course, in other examples, other combination of sensor measurements may be used.

Thus, the technical solutions described herein identify subsystems and the temporal measurements of physical properties, such as flow or pressure measurements. The measurement data may be processed such as by performing outlier removal, smoothing, short spike removal, or other such operations. The technical solutions further facilitate developing a synchronization model for synchronizing temporal measurements across different stations according to temporal lags. The technical solutions further facilitate determining a prediction model to determine a relationship between sensor measurements at a station and sensor measurements at other stations in the subsystem. The prediction model may be used to identify thresholds and anomalies based on known normal and leak events that occurred corresponding to the historical sensor measurements used to generate the prediction model. The technical solutions further include monitoring the pipeline network to detect/predict leak in the subsystem in response to detecting sensor measurements below and/or above determined threshold values. The technical solutions further include identifying anomaly scores to prevent false alarms by mapping determinations with historical sensor measurements and known leak events.

The technical solutions thus facilitate detecting leaks that are caused by a rupture in the pipeline network by using sensor measurements from multiple points of reference, and by taking into account the interaction between difference measurements, from different stations. By considering a single point of references, small anomalies in the system may be missed, leading to inaccuracies. Thus, the technical solutions overcome such inaccuracies in addition to the advantages that are described herein.

Detecting Signature Pattern of Small Leaks Caused by Small Damage on the Pipeline Network The technical solutions described herein further include using the temporal delay model and the prediction delay model of the temporal sensor measurements in the pipeline network, such as the high pressure gas pipeline system, to identify a benchmark values that represent operation of the pipeline network without leaks. Based on the benchmark values, the technical solutions further facilitate continuously detecting anomalies in the sensor measurements at the stations in the pipeline. The anomalies identified may be caused by relatively small damages to the pipeline that may lead to extended small leaks or even ruptures of the pipeline.

For example, the small damage may be a minor crack (compared to a rupture), or a partial clog, or any other damage that has not yet caused a large-scale problem in the pipeline network. The small damage causes small changes on the sensor measurement patterns such that system operation experts cannot detect the damage using SCADA monitoring system. An extended small leak may be a leak that leaks fluid below a predetermined threshold flow-rate and for at least a predetermined duration. For example, the server 20 may determine that leaks below the predetermined threshold flow-rate such as 1 milliliter per second, 5 milliliter per second, 5 liters per second, or any other flow-rate, is a 'small leak.' Of course, other examples may have other flow-rates that are considered small. An extended leak may be a leak that goes unrepaired (or unnoticed) for at least a predetermined time duration, such as 5 days, 10 days, or any other time duration. Accordingly, an extended small leak is a small leak that may continue unrepaired (or unnoticed) for at least the predetermined duration. The extended small leaks may cause relatively larger problems, such as erosion, ruptures and so on in the pipeline network. The technical solutions described herein facilitate detecting leaks in a pipeline network that are not detectable by the SCADA system over an extended period of time, such as days, weeks, months, or any other period of time.

Figure 13:
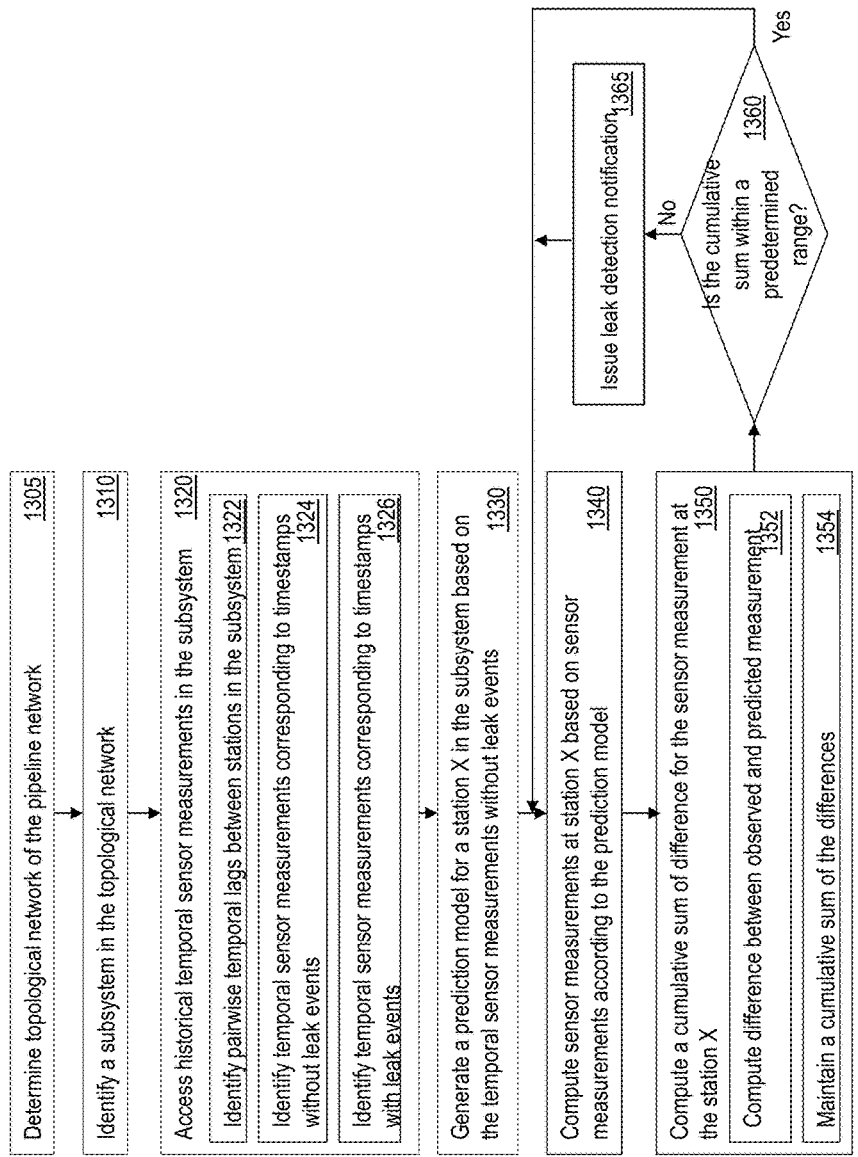
FIG. 13 illustrates a flowchart of example logic for detecting a small leak in a pipeline network that can lead to a rupture of the pipeline network, in accordance with an embodiment.
Figure 14:
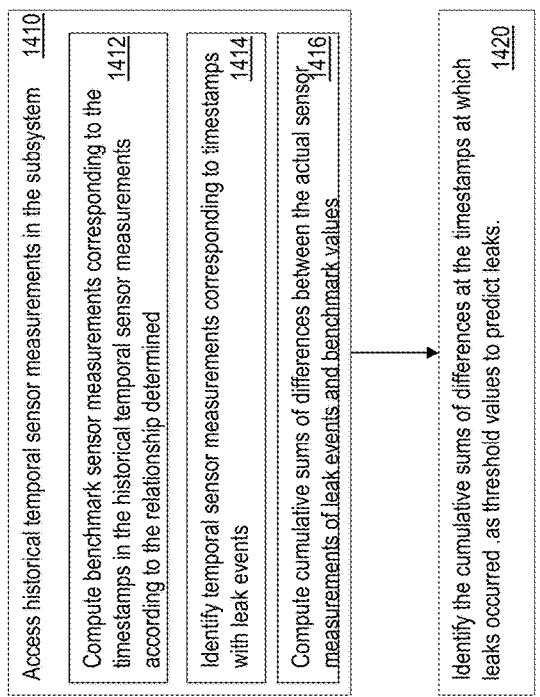
FIG. 14 illustrates a flowchart of example logic for determining thresholds for detecting a small leak in a pipeline network, in accordance with an embodiment.

FIG. 13 illustrates a flowchart for detecting signature pattern of small leaks caused by small damage on the pipeline network. The server 20 may implement the method illustrated by the FIG. 13, in an example.

The server 20 determines the topological network of the pipeline network 10, as shown at bock 1305. For example, the server 20 determines the topological network as described herein (see FIG. 3, for example). The server 20 further identifies a subsystem in the topological network, as shown at block 1310. The server 20 may obtain time series of measurement data, such as flow-rate, pressure, compressor operation status, weather information, and the like from the SCADA system for the stations in the subsystem, as shown at block 1320. For example, the server 20 accesses the historical temporal sensor measurements from the data repository 30. The historical temporal sensor measurements for a predetermined time-span may be accessed, for example, last six months, last one year, last 30 days, or any other predetermined time-span. In an example, the predetermined time-span is selected such that the pipeline network 10 has experienced one or more leaks due to ruptures of the infrastructure within the selected time-span. The server 20 may segregate the temporal sensor measurements, for example into a first subset that includes sensor measurements at timestamps at which leak events occurred and a second subset that includes sensor measurements at timestamps without leak events, as shown at blocks 1324 and 1326. In an example, the server 20 identifies the temporal lags between the temporal sensor measurements of the stations of the subsystem, as shown at block 1322. In an example, the temporal lags between the sensor measurements at the timestamps without the leak events are determined. For example, the server 20 may compute the temporal lags between two stations by finding the max correlation between the two time series values of the temporal sensor measurements at the two stations.

The server 20 generates a prediction model for each of the stations in the subsystem based on the historical temporal sensor measurements. The prediction model for each station may be unique. In another example, the server 20 generates the prediction models for each station in parallel. For example, the server 20 generates a prediction model for a first station in the subsystem, as shown at block 1330. The prediction model predicts sensor measurements at the first station based on the sensor measurements from each station in the subsystem, the sensor measurements corresponding to timestamps without leak events. Thus, the prediction model determines a relationship between the temporal sensor measurements of the stations in the subsystem, during operation of the subsystem without a leak event. For example, if the sensor measurement predicted is pressure, the prediction model determines a multivariate relationship, which may be expressed as in Table 4.

TABLE 4

$P_0(t) \sim \mathcal{F}(f_0(t), \ldots, f_n^{t,Lagged}, P_1^{t,Lagged}, \ldots, P_n^{t,Lagged}, T(t), C_0^{t,Lagged}, \ldots, C_n^{t,Lagged})$
where:
n is the number of stations, and measurement points in the subsystem.
$P_0(t)$ is the control variable, i.e., pressure measurements in the subsystem,
$f_0^{t,Lagged}, \ldots, f_n^{t,Lagged}$ are the upstream/downstream flows in the pipe segment, and its lagged time series, $f_i^{t,Lagged} = [f_i(t-L), \ldots, f_i(t-1)]$
$f_0(t)$ is the flow measurement from the same station as $P_0$
$P_1^{t,Lagged}, \ldots, P_n^{t,Lagged}$ are the pressure measurements at up-stream and down-stream of the pipe segment, and its lagged time series.
$T(t)$ is the air temperature
$C_0^{t,Lagged}, \ldots, C_n^{t,Lagged}$ are the compressor RPMs, and its lagged time series.

The relationship F, may be a non-linear model that maps a set of continuous variables to a controlled variable. For example, the relationship F may be determined based on robust machine learning techniques such as gradient boost machine, support vector machine, lasso linear model, or any other machine learning techniques or a combination thereof. Of course, in other examples the relationship may be determined differently, such as described elsewhere in this document. Accordingly, the server 20 determines a causality dependency of a sensor measurement at the first station and sensor measurements at other stations in the subsystem, as well as other sensor measurements at the first station. For example, the server 20 determines a causality dependency between pressure measurement at the first station and a combination of flow-rate measurements at the first station, and pressure and flow-rate measurements at the other stations in the subsystem.

According to the relationship model F, given a set of sensor measurements from the other stations in the subsystem and/or flow-rate measurement from the first station, the server 20 determines a predicted pressure measurement of the first station, as shown at block 1340. The predicted sensor measurement in this manner, such as the pressure measurement, is a benchmark value according to the relationship F. The relationship may also be referred to as a prediction model as it predicts the value of the sensor measurement given a set of inputs.

The server 20 computes a cumulative shift of the sensor measurement from the benchmark value by computing a cumulative sum of difference for the sensor measurement at the first station, as shown at block 1350. For example, as the sensor measurements are observed from the first station, a difference between each measurement and the corresponding benchmark value is calculated, and the difference is cumulatively summed up, as shown at blocks 1352 and 1354. The server 20 further determines if the, sensor measurement does not deviate significantly from the benchmark value by checking if the cumulative sum value is within a predetermined range, as shown at block 1360. Since measurements greater than the benchmark and those less than the benchmark average each other out, the cumulative sum value varies narrowly around the benchmark value, and thus are within the predetermined range, in case there are no leaks. If there is a leak, the sensor measurement is on one side of the benchmark, causing the cumulative sum value to depart progressively from that of the benchmark value, outside the predetermined range. Accordingly, the server issues a leak detect notification in case the cumulative sum value is outside the predetermined range, as shown at block 1365.

Thus, the technical solutions based on the cumulative sum, facilitate continuously monitoring the pipeline network 10 for small anomalies, which may be caused by small damage on the pipeline, which may lead to extended small leaks in the system, or ruptures in the pipeline network 10.

In addition, the technical solutions facilitate determining the predetermined range that may be used to check if the cumulative sum value indicates a leak. The server 20 accesses the historical temporal sensor measurements of the first station as shown at block 1410. The server 20 further computes benchmark sensor measurements for the first station based on the historical sensor measurements according to the relationship determined, as shown at block 1412. The server 20 further identifies and selects the computed benchmark values corresponding to the leak events, as shown at block 1414. The server 20 may further identify actual sensor measurements at the timestamps of the leaks for the first station, as shown at block 1414. The server 20 computes cumulative sums of the differences between the benchmark values and the actual values of the sensor measurements, as shown at block 1416. The server 20 identifies the cumulative sums of differences at the timestamps at which leaks occurred as threshold values to predict leaks, as shown at block 1420. In another example, the server 20 computes a mean, or a standard deviation of the cumulative sums of differences at the timestamps at which leaks occurred, as the thresholds, or boundaries of the predetermined range to check for prediction of leaks in the pipeline network 10.

Thus, the technical solutions described herein include detecting a small leak in a subsystem, and in turn in a pipeline network, such as a high-pressure gas pipeline network. Detecting a small leak may prevent ruptures and other larger issues with the pipeline network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for detecting leaks in a pipeline network, the method comprising:
   identifying a subsystem in the pipeline network, the subsystem comprising a plurality of stations that are topologically connected, the plurality of stations comprising a first station;
   accessing historical temporal sensor measurements of the stations in the subsystem, the historical temporal sensor measurements comprising pressure measurements captured at corresponding timestamps over a predetermined time-span;
   selecting, from the historical temporal sensor measurements, a first subset of pressure measurements corresponding to timestamps with leak events;
   generating a prediction model for the first station that predicts a pressure measurement at the first station based on the historical temporal sensor measurements at each station in the subsystem;
   predicting, according to the prediction model, a series of pressure measurements at the first station based on the historical temporal sensor measurements at each station in the subsystem, wherein the series of pressure measurements is for a series of timestamps in the historical temporal sensor measurements;
   selecting, from the series of pressure measurements, a second subset of pressure measurements corresponding to the timestamps with leak events;
   determining a series of deviations between the first subset of pressure measurements and the second subset of pressure measurements of the first station; and
   identifying a threshold value for detecting a leak in the subsystem based on the series of deviations, wherein a pressure measurement at the first station being above or below a predicted pressure measurement by the threshold value is indicative of a leak in the subsystem.

2. The computer implemented method of claim 1, wherein the historical temporal sensor measurements are accessed from a data repository of a SCADA system monitoring the pipeline network.

3. The computer implemented method of claim 1, wherein the prediction model predicts the pressure measurement at the first station based on a number of stations in the subsystem, an upstream flow-rate in the subsystem towards the first station, a downstream flow-rate in the subsystem away from the first station, a pressure measurement at an upstream station in the subsystem, and a pressure measurement at a downstream station in the subsystem.

4. The computer implemented method of claim 3, wherein the prediction model predicts the pressure measurement at the first station based further on an air-temperature measurement at the first station, a number of rotations at an upstream compressor in the subsystem, and a number of rotations at a downstream compressor in the subsystem.

5. The computer implemented method of claim 1, further comprising synchronizing the temporal sensor measurements at the first station and the rest of the stations, the synchronization comprising:
   identifying a temporal lag between temporal sensor measurements of the first station and temporal sensor measurements of a second station; and
   compensating for the temporal lag in the temporal sensor measurements of the second station for use in generating the prediction model.

6. The computer implemented method of claim 5, wherein the temporal lag between the temporal sensor measurements at the first station and the temporal sensor measurements at the second station is determined by computing maximum correlation value between the temporal sensor measurements at the first station and the temporal sensor measurements at the second station.

7. The computer implemented method of claim 1, wherein the threshold value is a multiple of standard deviation of the series of deviations.

8. The computer implemented method of claim 1, further comprising selecting, from the series of deviations, a subset of deviations corresponding to timestamps at which a leak in the pipeline network was reported, and using the selected subset of deviations to determine the threshold.

9. A system for detecting leaks in a pipeline network, the system comprising:
   a memory; and
   a processor configured to:
      identify a subsystem in the pipeline network, the subsystem comprising a plurality of stations that are topologically connected, the plurality of stations comprising a first station;
      access historical temporal sensor measurements of the stations in the subsystem, the historical temporal sensor measurements comprising pressure measurements captured at corresponding timestamps over a predetermined timespan;
      select, from the historical temporal sensor measurements, a first subset of pressure measurements corresponding to timestamps with leak events;
      generate a prediction model for the first station that predicts a pressure measurement at the first station based on the historical temporal sensor measurements at each station in the subsystem;
      predict, according to the prediction model, a series of pressure measurements at the first station based on the historical temporal sensor measurements at each station in the subsystem, wherein the series of pressure measurements is for a series of timestamps in the historical temporal sensor measurements;
      select, from the series of pressure measurements, a second subset of pressure measurements corresponding to the timestamps with leak events;
      determine a series of deviations between the first subset of pressure measurements and the second subset of pressure measurements of the first station; and
      identify a threshold value to detect a leak in the subsystem based on the series of deviations, wherein a pressure measurement at the first station above or below a predicted pressure measurement by the threshold value is indicative of a leak in the subsystem.

10. The system of claim 9, wherein the threshold value is a multiple of standard deviation of the series of deviations.

11. The system of claim 9, wherein the prediction model predicts the pressure measurement at the first station based on a number of stations in the subsystem, an upstream flow-rate in the subsystem towards the first station, a downstream flow-rate in the subsystem away from the first station, a pressure measurement at an upstream station in the subsystem, and a pressure measurement at a downstream station in the subsystem.

12. The system of claim 11, wherein the prediction model predicts the pressure measurement at the first station based further on an air-temperature measurement at the first station, a number of rotations at an upstream compressor in the subsystem, and a number of rotations at a downstream compressor in the subsystem.

13. The system of claim 9, wherein the processor is further configured to synchronize the historical temporal sensor measurements at the first station and at the rest of the stations, the synchronization comprising:
  identifying a temporal lag between temporal sensor measurements of the first station and temporal sensor measurements of a second station; and
  compensating for the temporal lag in the temporal sensor measurements of the second station for use in generating the prediction model.

14. The system of claim 13, wherein the temporal lag between the temporal sensor measurements at the first station and the temporal measurements at the second station is determined by computing maximum correlation value between the temporal sensor measurements at the first station and the temporal measurements at the second station.

15. A computer program product for detecting leaks in a pipeline network, the computer program product comprising a computer readable storage media, and the computer readable storage media comprising instructions to:
  identify a subsystem in the pipeline network, the subsystem comprising a plurality of stations that are topologically connected, the plurality of stations comprising a first station;
  access historical temporal sensor measurements of the stations in the subsystem, the historical temporal sensor measurements comprising pressure measurements captured at corresponding timestamps over a predetermined time-span;
  select, from the historical temporal sensor measurements, a first subset of pressure measurements corresponding to timestamps with leak events;
  generate a prediction model for the first station that predicts a pressure measurement at the first station based on the historical temporal sensor measurements at each station in the subsystem;
  predict, according to the prediction model, a series of pressure measurements at the first station based on the historical temporal sensor measurements at each station in the subsystem, wherein the series of pressure measurements is for a series of timestamps in the historical temporal sensor measurements;
  select, from the series of pressure measurements, a second subset of pressure measurements corresponding to the timestamps with leak events;
  determine a series of deviations between the first subset of pressure measurements and the second subset of pressure measurements of the first station; and
  identify a threshold value to detect a leak in the subsystem based on the selected series of deviations, wherein a pressure measurement at the first station above or below a predicted pressure measurement by the threshold value is indicative of a leak in the subsystem.

16. The computer program product of claim 15, wherein the threshold value is a multiple of standard deviation of the series of deviations.

17. The computer program product of claim 15, wherein the prediction model predicts the pressure measurement at the first station based on a number of stations in the subsystem, an upstream flow-rate in the subsystem towards the first station, a downstream flow-rate in the subsystem away from the first station, a pressure measurement at an upstream station in the subsystem, and a pressure measurement at a downstream station in the subsystem.

18. The computer program product of claim 17, wherein the prediction model predicts the pressure measurement at the first station based further on an air-temperature measurement at the first station, a number of rotations at an upstream compressor in the subsystem, a number of rotations at a downstream compressor in the subsystem, and compressor energy usage.

19. The computer program product of claim 15, wherein the computer readable storage media further comprises instructions to synchronize the historical temporal sensor measurements at the first station and at the rest of the stations, the synchronization comprising:
  identifying a temporal lag between temporal sensor measurements of the first station and temporal sensor measurements of a second station; and
  compensating for the temporal lag in the temporal sensor measurements of the second station for use in generating the prediction model.

20. The computer program product of claim 19, wherein the temporal lag between the temporal sensor measurements at the first station and the temporal sensor measurements at the second station is determined by computing maximum correlation value between the temporal sensor measurements at the first station and the temporal sensor measurements at the second station.

* * * * *